(12) United States Patent
Ogawa (10) Patent No.: US 11,626,647 B2
(45) Date of Patent: Apr. 11, 2023

(54) ENERGY STORAGE DEVICE AND ENERGY STORAGE APPARATUS COMPRISING A GAS RELEASE VALVE HAVING A PLURALITY OF BRANCH POINTS

(71) Applicant: GS Yuasa International Ltd., Kyoto (JP)

(72) Inventor: Yusuke Ogawa, Kyoto (JP)

(73) Assignee: GS YUASA INTERNATIONAL LTD., Kyoto (JP)

( * ) Notice: Subject to any disclaimer, the term of this patent is extended or adjusted under 35 U.S.C. 154(b) by 343 days.

(21) Appl. No.: 16/641,826

(22) PCT Filed: Aug. 22, 2018

(86) PCT No.: PCT/JP2018/031051
§ 371 (c)(1),
(2) Date: Feb. 25, 2020

(87) PCT Pub. No.: WO2019/044633
PCT Pub. Date: Mar. 7, 2019

(65) Prior Publication Data
US 2020/0395582 A1    Dec. 17, 2020

(30) Foreign Application Priority Data
Aug. 29, 2017   (JP) .............................. JP2017-164801

(51) Int. Cl.
*H01M 50/342* (2021.01)
*H01M 50/147* (2021.01)

(52) U.S. Cl.
CPC ..... *H01M 50/3425* (2021.01); *H01M 50/147* (2021.01)

(58) Field of Classification Search
CPC ........................ H01M 50/3425; H01M 50/147
See application file for complete search history.

(56) References Cited

U.S. PATENT DOCUMENTS

| 2011/0212350 A1 | 9/2011 | Sato et al. |
| 2011/0305946 A1 | 12/2011 | Moride |

(Continued)

FOREIGN PATENT DOCUMENTS

| JP | H07-130346 A | 5/1995 |
| JP | 2000331661 A | * 11/2000 |

(Continued)

OTHER PUBLICATIONS

EPO machine generated English translation of JP-2000-331661-A (Year: 2000).*

(Continued)

*Primary Examiner* — Christopher P Domone
*Assistant Examiner* — Kimberly Wyluda
(74) *Attorney, Agent, or Firm* — McGinn I.P. Law Group, PLLC.

(57) ABSTRACT

An energy storage device is provided with a case including a lid body in which a gas release valve is formed. The gas release valve includes a thin wall with a thickness smaller than a thickness of a portion adjacent to the gas release valve. The thin wall includes an intermediate portion and two lateral portions that are arranged at positions sandwiching the intermediate portion in a first direction. As viewed from a normal direction to the lid body, the intermediate portion is disposed at the middle position in the first direction of the lid body and is formed with a width, in a second direction orthogonal to the first direction, smaller than those of the two lateral portions.

16 Claims, 6 Drawing Sheets

(56) References Cited

U.S. PATENT DOCUMENTS

| | | | |
|---|---|---|---|
| 2012/0328934 A1* | 12/2012 | Watanabe | ............... H01G 9/08 |
| | | | 429/185 |
| 2015/0118531 A1 | 4/2015 | Kondo et al. | |
| 2015/0280191 A1 | 10/2015 | Matsudo et al. | |
| 2021/0359373 A1* | 11/2021 | Kadota | ............ H01M 50/3425 |

FOREIGN PATENT DOCUMENTS

| | | | |
|---|---|---|---|
| JP | 2002-367583 A | 12/2002 | |
| JP | 2004-095457 A | 3/2004 | |
| JP | 2006-216435 A | 8/2006 | |
| JP | 2010-165590 A | 7/2010 | |
| JP | 2013-020988 A | 1/2013 | |
| JP | 2015-085356 A | 5/2015 | |
| JP | 2016-157570 A | 9/2016 | |
| WO | WO 2010/100731 A1 | 9/2012 | |
| WO | WO 2014/073518 A1 | 9/2016 | |

OTHER PUBLICATIONS

EPO machine generated English translation of JP 2004-095457A (Year: 2004).*

EPO machine generated English translation of JP 2002-367583A (Year: 2002).*

International Search Report (ISR) (PCT Form PCT/ISA/210), in PCT/JP2018/031051, dated Nov. 13, 2018.

* cited by examiner

ENERGY STORAGE DEVICE AND ENERGY STORAGE APPARATUS COMPRISING A GAS RELEASE VALVE HAVING A PLURALITY OF BRANCH POINTS

TECHNICAL FIELD

The present invention relates to an energy storage device provided with a case including a wall in which a gas release valve is formed, and an energy storage apparatus provided with the energy storage device.

BACKGROUND ART

Conventionally, there is widely known an energy storage device provided with a case including a wall in which a gas release valve is formed. For example, Patent Document 1 discloses a sealed battery (energy storage device) in which a gas release valve (safety valve) is formed in a sealing plate (wall) that closes the opening of the case.

PRIOR ART DOCUMENT

Patent Document

Patent Document 1: JP-A-2013-20988

SUMMARY OF THE INVENTION

Problems to be Solved by the Invention

However, in the conventional energy storage device, the durability of the gas release valve may be reduced. That is, in Patent Document 1, an elliptic gas release valve is formed at the middle position of the wall, but in an energy storage device, generally, the case deforms most at the middle position of the wall due to the influence of internal pressure. For this reason, in the conventional energy storage device as disclosed in Patent Document 1, stress is applied to the middle portion of the gas release valve, and the durability of the gas release valve may be reduced.

An object of the present invention is to provide an energy storage device and energy storage apparatus that can improve durability of a gas release valve.

Means for Solving the Problems

An energy storage device according to one aspect of the present invention is an energy storage device provided with a case including a wall in which a gas release valve is formed. The gas release valve includes a thin wall with a thickness smaller than a thickness of a portion adjacent to the gas release valve. The thin wall includes an intermediate portion and two lateral portions that are arranged at positions sandwiching the intermediate portion in a first direction. As viewed from a normal direction to the wall, the intermediate portion is disposed at a middle position in the first direction of the wall and is formed with a width, in a second direction orthogonal to the first direction, smaller than widths of the two lateral portions.

An energy storage device according to another aspect of the present invention is an energy storage device provided with a case including a wall in which a gas release valve is formed. The gas release valve includes a thin wall with a thickness smaller than a thickness of a portion adjacent to the gas release valve. The thin wall includes an intermediate portion and two lateral portions that are arranged at positions sandwiching the intermediate portion in a first direction. The intermediate portion is formed with a width, in a second direction orthogonal to the first direction, smaller than widths of the two lateral portions as viewed from a normal direction to the wall. A groove is formed in the thin wall. The groove has a plurality of branch points, each of which branches into a plurality of grooves.

An energy storage apparatus according to one aspect of the present invention is provided with a plurality of energy storage devices including at least one of the energy storage devices described above.

Advantages of the Invention

According to the energy storage device and the like in the present invention, the durability of the gas release valve can be improved.

MODES FOR CARRYING OUT THE INVENTION

An energy storage device according to one aspect of the present invention is an energy storage device provided with a case including a wall in which a gas release valve is formed. The gas release valve includes a thin wall with a thickness smaller than a thickness of a portion adjacent to the gas release valve. The thin wall includes an intermediate portion and two lateral portions that are arranged at positions sandwiching the intermediate portion in a first direction. As viewed from a normal direction to the wall, the intermediate portion is disposed at a middle position in the first direction of the wall and is formed with a width, in a second direction orthogonal to the first direction, smaller than widths of the two lateral portions.

According to this, in the energy storage device, the intermediate portion of the thin wall in the gas release valve is disposed at the middle position of the wall, and is formed to be smaller in width than the two lateral portions sandwiching the intermediate portion. As thus described, in the gas release valve, the intermediate portion disposed at the middle position of the wall is formed to be smaller in width than the lateral portions on both sides, so that it is possible to enhance the rigidity of the intermediate portion that is likely to deform due to fluctuations in the internal pressure of the case. Thereby, the intermediate portion of the thin wall in the gas release valve can be prevented from deforming, so that the durability of the gas release valve can be improved.

A groove may be formed in the thin wall, and the groove may have a plurality of branch points, each of which branches into a plurality of grooves.

According to this, in the gas release valve, the groove in the thin wall has the plurality of branch points, each of which branches into a plurality of grooves. By dividing the branch point (intersection) of the groove in the thin wall into a plurality of sections as thus described, it is possible to avoid stress concentration at the branch point and further prevent the deformation of the thin wall. By dividing the branch point into a plurality of sections, the pressure at which the gas release valve is opened can be made easily adjustable.

The plurality of branch points may be provided in the intermediate portion.

According to this, in the gas release valve, the plurality of branch points of the groove in the thin wall are disposed in the intermediate portion. That is, although stress is likely to concentrate at the branch point, since the rigidity of the intermediate portion has been enhanced, deformation is unlikely to occur even when the branch point is disposed in the intermediate portion. By disposing the plurality of branch points in the intermediate portion where pressure is likely to be applied, the gas release valve can be opened with the plurality of branch points as starting points.

The plurality of branch points may be disposed within a linear groove.

According to this, in the gas release valve, the plurality of branch points of the groove in the thin wall are disposed within the linear groove. That is, the gas release valve opens with the branch point as the starting point, and since the groove extends linearly from the branch point to both sides, the gas release valve can be smoothly opened with the branch point as the starting point. For this reason, while the durability of the gas release valve is improved, the gas release valve can be quickly opened once the valve starts to open.

A groove may be formed in at least one of the two lateral portions, and in the lateral portion in which the groove is formed, a first part on an inner side of the lateral portion with respect to the groove may be formed to have higher rigidity than a second part on an outer side of the lateral portion with respect to the groove.

According to this, in the lateral portions of the gas release valve, the first part on the inner side with respect to the groove is formed to have higher rigidity than in the second part on the outer side with respect to the groove. By increasing the rigidity on the inner side of the groove in the lateral portion as thus described, it is possible to prevent the deformation on the inner side where pressure is likely to be applied and to further improve the durability of the gas release valve.

A groove may be formed in at least one of the two lateral portions, and the groove may be formed discontinuously on an opposite side to the intermediate portion.

According to this, the groove in the lateral portion of the gas release valve is formed discontinuously on the opposite side to the intermediate portion. As a result, even when the groove on the intermediate portion side is torn in the lateral portion during the opening of the gas release valve, a place on the opposite side to the intermediate portion where the groove is discontinuously formed is hardly torn, and hence the lateral portion can be prevented from scattering. In particular, the gas release valve with improved durability opens vigorously, and hence the effect of preventing the scattering of the lateral portions is large.

An energy storage device according to another aspect of the present invention is an energy storage device provided with a case including a wall in which a gas release valve is formed. The gas release valve includes a thin wall with a thickness smaller than a thickness of a portion adjacent to the gas release valve. The thin wall includes an intermediate portion and two lateral portions that are arranged at positions sandwiching the intermediate portion in a first direction. The intermediate portion is formed with a width, in a second direction orthogonal to the first direction, smaller than widths of the two lateral portions as viewed from a normal direction to the wall. A groove is formed in the thin wall. The groove has a plurality of branch points, each of which branches into a plurality of grooves.

According to this, in the energy storage device, the intermediate portion of the thin wall in the gas release valve is formed to be smaller in width than the two lateral portions sandwiching the intermediate portion, and the groove in the thin wall has a plurality of branch points, each of which branches into a plurality of grooves. As thus described, in the gas release valve, by forming the intermediate portion of the thin wall to be smaller in width than the lateral portions on both sides, it is possible to enhance the rigidity in the intermediate portion, and prevent the deformation of the thin wall of the gas release valve. By dividing the branch point (intersection) of the groove in the thin wall into a plurality of sections, it is possible to avoid stress concentration at the branch point and further prevent the deformation of the thin wall. Thereby, the durability of the gas release valve can be improved.

An energy storage apparatus according to one aspect of the present invention is provided with a plurality of energy storage devices including at least one of the energy storage devices described above.

For discharging a large amount of gas from the gas release valve at high speed, it is preferable to increase the opening area of the gas release valve. However, when the opening area of the gas release valve is increased, the durability of the gas release valve may be reduced. In the above energy storage device, the opening area of the gas release valve can be increased by improving the durability of the gas release valve. In the energy storage apparatus provided with the energy storage device including the gas release valve as above, when gas is generated inside the energy storage device, the gas release valve is opened, and a large amount of gas can be discharged from the gas release valve at high speed. Hence it is possible to prevent the heat generation of the energy storage device in which gas has been generated, thereby preventing the influence of heat from transmitting sequentially to an adjacent energy storage device, for example.

A groove may be formed in at least one of the two lateral portions provided in the energy storage device, and the groove may be formed discontinuously on a side in a direction intersecting the direction in which the plurality of energy storage devices are aligned.

According to this, since the groove formed in the gas release valve of the energy storage device is formed discontinuously on the side in the direction intersecting the direction in which the plurality of energy storage devices are aligned, when the gas release valve is opened, gas from the gas release valve can be exhausted in the direction in which the plurality of energy storage devices are aligned. Thus, when a plurality of energy storage devices each having the gas release valve are aligned, exhaust gas from each of the plurality of energy storage devices can be smoothly and collectively exhausted in the direction in which the plurality of energy storage devices are aligned.

The present invention can be realized not only as an energy storage device and an energy storage apparatus but also as a gas release valve provided in the energy storage device.

Hereinafter, an energy storage device and an energy storage apparatus according to the embodiment of the present invention and its modifications will be described with reference to the drawings. Any of the embodiment and its modifications described below is a comprehensive or specific example. Numerical values, shapes, materials, components, placement positions of the components, connection forms, and the like shown in the embodiment and its modifications below are merely examples and are not intended to limit the present invention. Among components in the following the embodiment and its modifications, the component being not described in the independent claims indicating the highest concept, will be described as optional components. In each figure, dimensions and the like are not illustrated strictly.

In the following description and drawings in the embodiments, the direction in which a pair of electrode terminals of the energy storage device are aligned, the direction in which a pair of current collectors are aligned, the arrangement direction of both ends of the electrode assembly (a pair of active material layer non-forming portions), the winding axis direction of the electrode assembly, the width direction of the legs of the current collector, or the facing direction of the short side surface of the case is defined as the X-axis direction (or the first direction). The facing direction of the long side surface of the case, the short side direction of the short side surface of the case, or the thickness direction of the case is defined as the Y-axis direction (or the second direction). The direction in which a case body and a lid body of the energy storage device are aligned, the longitudinal direction of the short side surface of the case, the extending direction of the legs of the current collector, or the vertical direction is defined as the Z-axis direction. The X-axis direction, Y-axis direction, and Z-axis direction are directions that intersect (orthogonal in the present embodiment). Although a case where the Z-axis direction does not become the vertical direction may be considered depending on the usage mode, the Z-axis direction will be described below as the vertical direction for the convenience of description. In the following description, the X-axis-direction plus side indicates the arrow direction side of the X-axis, and the X-axis-direction minus side indicates the opposite side to the X-axis-direction plus side. The same applies to the Y-axis direction and the Z-axis direction.

Embodiment

1 General Description of Energy Storage Device 10

Figure 1:
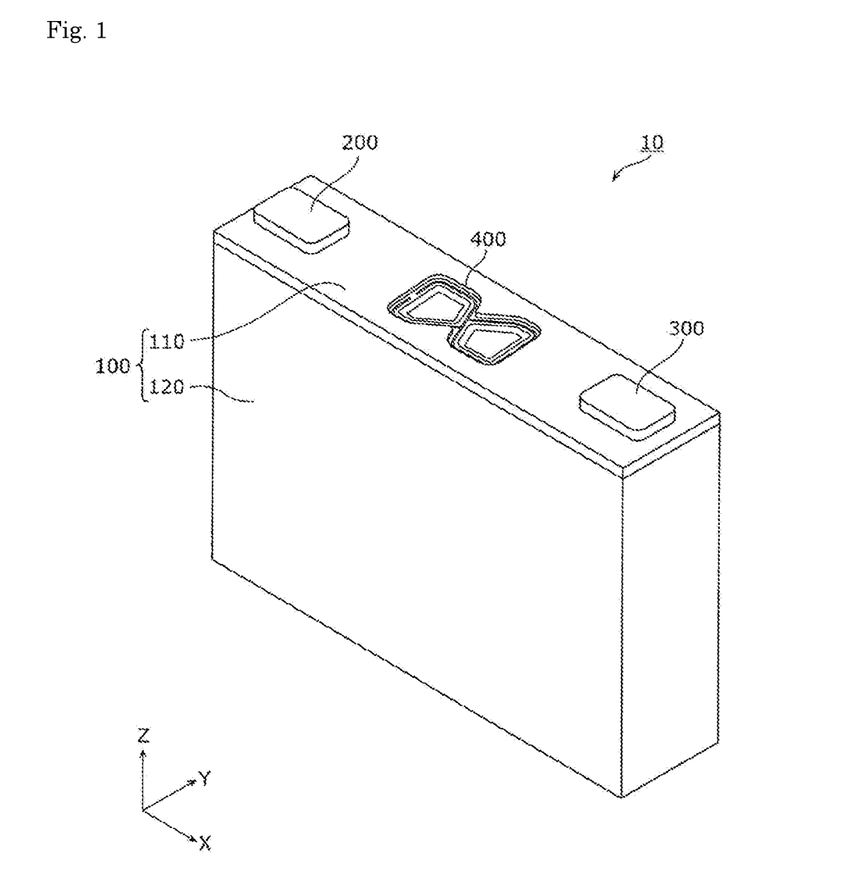
FIG. 1 is a perspective view showing an external appearance of an energy storage device according to an embodiment.
Figure 2:
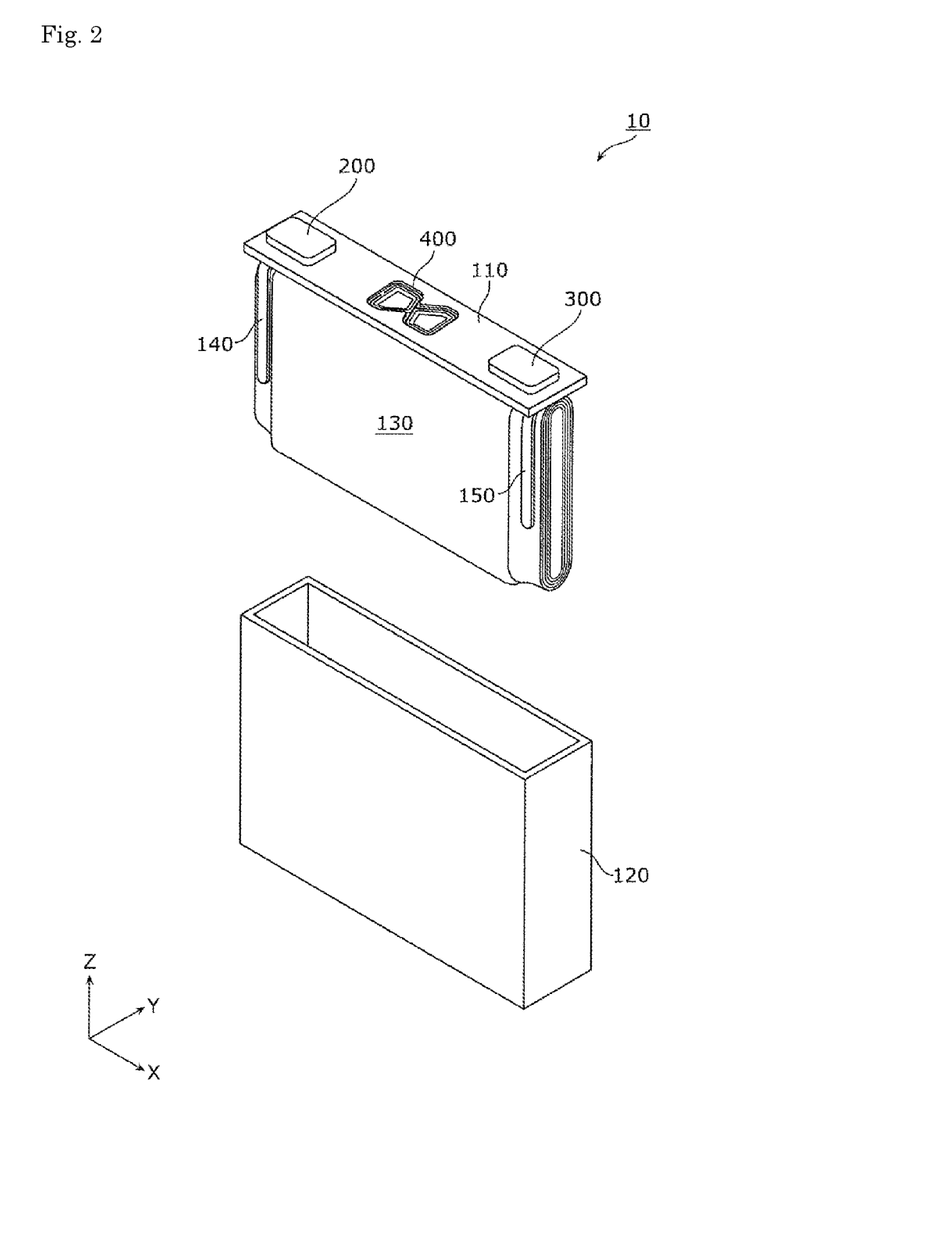
FIG. 2 is a perspective view showing each component included in the energy storage device according to the embodiment.

First, a general description of an energy storage device 10 in the present embodiment will be given with reference to FIGS. 1 and 2. FIG. 1 is a perspective view showing the external appearance of the energy storage device 10 according to the present embodiment. FIG. 2 is a perspective view showing each component included in the energy storage device 10 according to the present embodiment. Specifically, FIG. 2 is a perspective view showing a configuration in a state where a case body 120 is separated from the energy storage device 10.

The energy storage device 10 is a secondary battery that can be charged and discharged with electricity. Specifically, the energy storage device 10 is a nonaqueous electrolyte secondary battery such as a lithium ion secondary battery. The energy storage device 10 is used as a power source for an automobile such as an electric vehicle (EV), a hybrid electric vehicle (HEV), or a plug-in hybrid electric vehicle (PHEV), a power source for electronic devices, a power storage power source, or the like. The energy storage device 10 is not limited to a nonaqueous electrolyte secondary battery, but may be a secondary battery other than the nonaqueous electrolyte secondary battery or may be a capacitor. The energy storage device 10 may not be a secondary battery but may be a primary battery that can use stored electricity without being charged by the user. In the present embodiment, energy storage device 10 has a rectangular (prismatic) shape.

As shown in FIG. 1, the energy storage device 10 includes a case 100 having a lid body 110 and a case body 120, a positive terminal 200, and a negative terminal 300. As shown in FIG. 2, an electrode assembly 130, a positive current collector 140, and a negative current collector 150 are housed inside the case 100.

A gasket and the like are disposed between the lid body 110 and the positive terminal 200 and between the lid body 110 and the positive current collector 140 in order to enhance insulation and airtightness, but the gasket and the like are omitted in the figure. The same applies to the negative electrode side. An electrolyte solution (nonaqueous electrolyte solution) is sealed inside the case 100, but the illustration is omitted. The electrolyte solution is not particularly limited in terms of its type so long as not impairing the performance of the energy storage device 10, and various electrolyte solutions can be selected. In addition to the above components, a spacer disposed on the side of the positive current collector 140 and the negative current collector 150, a liquid injector for injecting an electrolyte solution into the case 100, or an insulating film that encloses the electrode assembly 130, or the like may be disposed.

The case 100 is a rectangular parallelepiped (box-shaped) case made up of the case body 120 having a rectangular tube shape with a bottom and the lid body 110 being a plate-like member that closes the opening of the case body 120. Specifically, the lid body 110 is a flat and rectangular wall extending in the X-axis direction and is disposed on the Z-axis-direction plus side of the case body 120. The case body 120 has five walls that are a flat and rectangular bottom wall on the Z-axis-direction minus side, flat and rectangular long side walls on both sides in the Y-axis direction, flat and rectangular side walls on both sides in the X-axis direction, and a rectangular short side wall. The case 100 can be hermetically sealed by housing the electrode assembly 130 and the like inside the case body 120 and then welding the lid body 110 and the case body 120 to each other or by some other way. The material of the lid body 110 and the case body 120 is not particularly limited but is preferably a weldable metal such as stainless steel, aluminum, an aluminum alloy, iron, or plated steel plate.

A gas release valve 400 is disposed in the lid body 110. Specifically, the gas release valve 400 is disposed at the middle position of the lid body 110 (the middle position in the X-axis direction and the middle position in the Y-axis direction). The gas release valve 400 is a safety valve that releases pressure inside the case 100 when the pressure inside the case 100 rises. That is, the gas release valve 400 includes a thin wall, and when the internal pressure of the case 100 reaches a predetermined opening pressure, the thin wall is broken and opened, so that the internal pressure of the case 100 is released.

In the present embodiment, the gas release valve 400 is disposed at the center position of the lid body 110 (the center position in the X-axis direction and the center position in the Y-axis direction) as viewed from the Z-axis-direction plus side That is, the above "middle position" is the center position in the present embodiment. The "middle position" is not limited to the center position, and a slight shift from the center position is allowed. For example, the "middle position" may be shifted by about 20% of the width from the center position of the width of the lid body 110 (width in the X-axis direction or Y-axis direction), and may be preferably shifted by about 10% of the width, and may be more preferably shifted by about 5% of the width. The same applies to the "middle position" below.

In the present embodiment, the gas release valve 400 is formed integrally with the lid body 110. That is, the lid body 110 in which the gas release valve 400 is formed can be manufactured by pressing a plate material. Hence the gas release valve 400 is formed of the same material as the lid body 110. The gas release valve 400 may be configured separately from the lid body 110. For example, the gas release valve 400 may be disposed at the middle position of the lid body 110 by forming an opening at the middle position of the lid body 110, fitting the gas release valve 400 into the opening, and joining the gas release valve 400 to the lid body 110 by welding or the like. In this case, the material of the gas release valve 400 is not particularly limited but can be formed of aluminum, an aluminum alloy, iron, copper, a copper alloy, stainless steel, plated steel plate, plated copper, clad material (Fe—Ni, Ni—Cu, Al—Ni), or the like. A detailed description of the configuration of the gas release valve 400 will be described later.

The electrode assembly 130 includes a positive electrode plate, a negative electrode plate, and a separator, and is a power storage element (power generating element) that can store electricity. The positive electrode plate is an electrode plate in which a positive active material layer is formed on a positive substrate layer that is a long strip-shaped current collector foil made of aluminum or an aluminum alloy. The negative electrode plate is an electrode plate in which a negative active material layer is formed on a negative substrate layer that is a long strip-shaped current collector foil made of copper or a copper alloy. The separator is a microporous sheet made of resin or the like. The electrode assembly 130 is formed by disposing and winding a separator between a positive electrode plate and a negative electrode plate. In the present embodiment, an elliptic shape is illustrated as the cross-sectional shape of the electrode assembly 130, but an elliptic shape, a circular shape, a polygonal shape, or the like may be used. The shape of the electrode assembly 130 is not limited to a wound type but may be a laminated type in which flat electrode plates are laminated.

The positive terminal 200 is an electrode terminal electrically connected to the positive electrode plate of the electrode assembly 130, and the negative terminal 300 is an electrode terminal electrically connected to the negative electrode plate of the electrode assembly 130. In other words, the positive terminal 200 and the negative terminal 300 are metal electrode terminals that lead the electricity stored in the electrode assembly 130 to the external space of the energy storage device 10, and introduce the electricity into the internal space of the energy storage device 10 so as to store the electricity in the electrode assembly 130. The positive terminal 200 and the negative terminal 300 are attached to the lid body 110 disposed above the electrode assembly 130.

The positive current collector 140 and the negative current collector 150 are members provided with electroconductivity and rigidity, the members being disposed between the electrode assembly 130 and the wall surface of the case 100, and are electrically connected to the positive terminal 200, the negative terminal 300, and the positive electrode plate and the negative electrode plate of the electrode assembly 130. The material of the positive current collector 140 is not limited but is, formed of aluminum or an aluminum alloy, similarly to the positive substrate layer of the electrode assembly 130. Also, the material of the negative current collector 150 is not limited but is, for example, formed of copper or a copper alloy, similarly to the negative substrate layer of the electrode assembly 130.

2 Description of Configuration of Gas Release Valve 400

Figure 3:
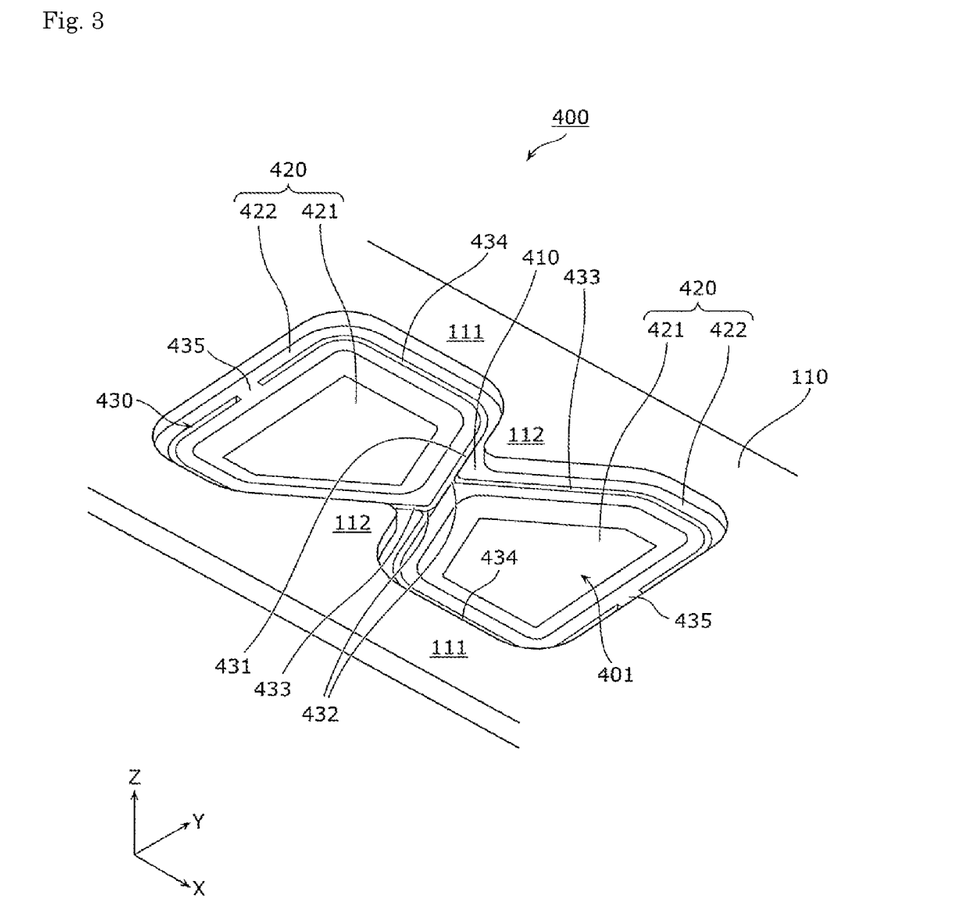
FIG. 3 is a perspective view showing a configuration of a gas release valve according to the embodiment.
Figure 4:
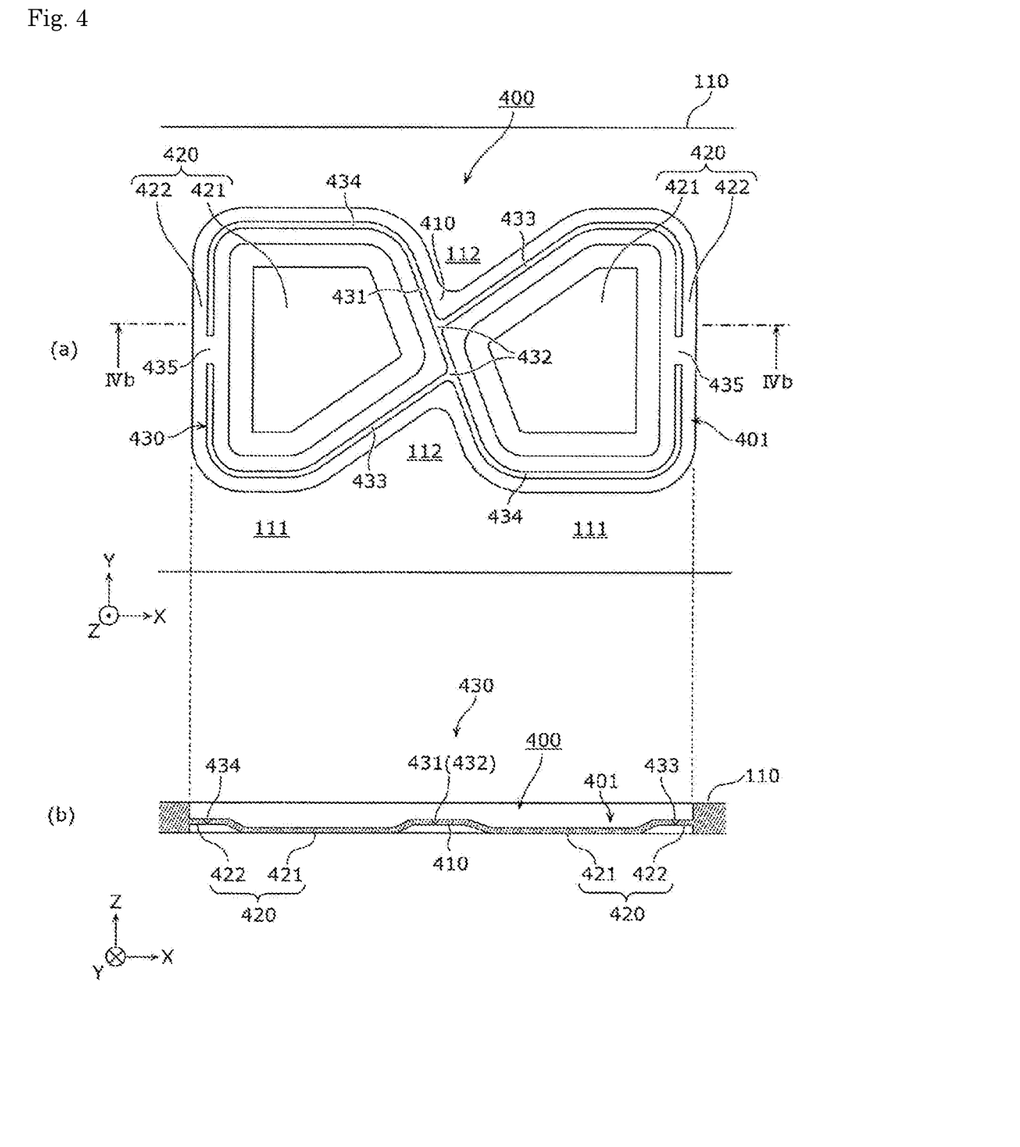
FIG. 4 is a plan view and a cross-sectional view showing the configuration of the gas release valve according to the embodiment.

Next, the configuration of the gas release valve 400 will be described in detail. FIG. 3 is a perspective view showing the configuration of the gas release valve 400 according to the present embodiment. Specifically, FIG. 3 is an enlarged perspective view showing the configuration of the gas release valve 400 in FIGS. 1 and 2. FIG. 4 is a plan view and a cross-sectional view showing the configuration of the gas release valve 400 according to the present embodiment. Specifically, (a) of FIG. 4 is a plan view showing a configuration when the gas release valve 400 of FIG. 3 is viewed from the Z-axis-direction plus side, and (b) of FIG. 4 is a cross-sectional view showing a configuration when the gas release valve 400 of (a) of FIG. 4 is cut along a IVb-IVb cross-section.

As shown in FIGS. 3 and 4, the gas release valve 400 includes a thin wall 401 that is thinner than a portion adjacent to the gas release valve 400. That is, the thin wall 401 is a thin wall formed at the middle position of the lid body 110 and, for example, has a thickness of about 10% to 30% (about 0.2 mm to 0.5 mm) with respect to the thickness of each of portions (adjacent portions 111, 112) adjacent to the thin wall 401 of the lid body 110. The thickness of the thin wall 401 is not limited to the above but is appropriately determined depending on the opening pressure of the gas release valve 400 or the like. Portions except for the gas release valve 400 of the lid body 110 have a substantially uniform thickness. That is, in the lid body 110, the adjacent portions 111, 112 have the same thickness as the outer portions of the adjacent portions 111, 112.

[2.1 Description of Configuration of Intermediate Portion 410 and Lateral Portions 420 in Thin Wall 401]

The thin wall 401 includes an intermediate portion 410 disposed at the middle position of the thin wall 401 and two lateral portions 420 arranged on both sides of the intermediate portion 410 so as to sandwich the intermediate portion 410 in the X-axis direction. That is, the intermediate portion 410 is a portion disposed at the middle position of the gas release valve 400 (the middle position in the X-axis direction and the middle position in the Y-axis direction). Since the gas release valve 400 is disposed at the middle position of the lid body 110, the intermediate portion 410 is disposed at the middle position of the lid body 110 (the middle position in the X-axis direction and the middle position in the Y-axis direction).

The thick adjacent portions 111 are arranged on both sides of the lateral portion 420 in the Y-axis direction. The adjacent portions 112, protruding from the adjacent portions 111 toward the intermediate portion 410, are arranged on both sides of the intermediate portion 410 in the Y-axis direction. Thus, the intermediate portion 410 is formed to be smaller in width in the Y-axis direction than the two lateral portions 420. That is, in the thin wall 401, the middle portion in the X-axis direction has an hourglass shape. For example, the width of the intermediate portion 410 in the Y-axis direction has a size of about 20% to 50% of the maximum width of the lateral portion 420 in the Y-axis direction. The width of the intermediate portion 410 is not limited to the above but is appropriately determined depending on the opening pressure of the gas release valve 400 or the like.

As described above, the intermediate portion 410 is disposed at the middle position in the first direction (X-axis direction) of the lid body 110 as viewed from the normal direction to the lid body 110 (Z-axis direction), and is formed to be smaller in width in the second direction (Y-axis direction) orthogonal to the first direction than the two lateral portions 420. The lateral portions 420 are arranged at positions sandwiching the intermediate portion 410 in the first direction (X-axis direction).

The two lateral portions 420 are arranged at point-symmetrical positions with respect to the center of the intermediate portion 410. That is, the two lateral portions 420 are arranged such that, when one lateral portion 420 is rotated by 180° around the center of the intermediate portion 410, the one lateral portion 420 overlaps the other lateral portion 420. Hence the thin wall 401 has a point-symmetric shape with respect to the center of the intermediate portion 410. Each lateral portion 420 has a shape in which the width in the Y-axis direction increases as the distance from the intermediate portion 410 increases. In the present embodiment, the lateral portion 420 has a pentagonal shape having the longest side on the end side in the X-axis direction. In other words, in the thin wall 401, the rectangular middle portion that is long in the X-axis direction has an hourglass shape.

[2.2 Description of Configuration of Groove 430 in Thin Wall 401]

A groove 430 is formed in the thin wall 401. That is, the groove 430 is formed in the intermediate portion 410 and the two lateral portions 420. The groove 430 is a groove having a substantially triangular cross-sectional shape, and for example, the thickness of the thin wall 401 in the groove 430 is about 10% to 20% (about several tens of micrometers) of the thickness of the thin wall 401 in a place except for the groove 430. The thickness of the thin wall 401 in the groove 430 is not limited to the above but is appropriately determined depending on the opening pressure of the gas release valve 400 or the like. The cross-sectional shape of the groove 430 is not particularly limited, either.

Specifically, the groove 430 is a groove formed across the middle of the intermediate portion 410 and along the periphery of the two lateral portions 420, and is disposed in a point-symmetrical position with respect to the center of the intermediate portion 410. More specifically, the groove 430 includes a linear groove 431 obliquely crossing the intermediate portion 410, a plurality of grooves 433 branching from a plurality of branch points 432 on the groove 431, and a groove 434 connected to both ends of the groove 431.

The groove 431 is a linear groove obliquely crossing the intermediate portion 410 from the X-axis-direction minus side and the Y-axis-direction plus side of the intermediate portion 410 toward the X-axis-direction plus side and the Y-axis-direction minus side of the intermediate portion 410 to connect the two lateral portions 420.

The branch point 432 is a point where the groove 430 branches into a plurality of grooves, and in the present embodiment, the branch point 432 branches into the groove 431 and the groove 433. In other words, the branch point 432 is a place where a plurality of grooves intersect, and in the present embodiment, the groove 431 and the groove 433 intersect at the branch point 432. The plurality of branch points 432 are disposed in the intermediate portion 410. That is, a plurality of branch points 432 (two branch points 432 in the present embodiment) are disposed within the linear groove 431. Specifically, the plurality of branch points 432 are disposed at symmetrical (equal distance) positions from the center of the groove 431. That is, the plurality of branch points 432 are disposed at positions off the center of the groove 431.

The groove 433 is a groove extending from the branch point 432 along the periphery of the lateral portion 420. That is, the two grooves 433 are extended from the two branch points 432 along the periphery of the two lateral portions 420. Specifically, one groove 433 of the two grooves 433 is extended along the periphery of the lateral portion 420 on the Y-axis-direction plus side out of the periphery of the lateral portion 420 on the X-axis-direction plus side. The other groove 433 is extended along the periphery of the lateral portion 420 on the Y-axis-direction minus side out of the periphery of the lateral portion 420 on the X-axis-direction minus side.

The groove 434 is a groove extending from the end of the linear groove 431 along the periphery of the lateral portion 420. That is, the two grooves 434 are extended from both ends of the linear groove 431 along the periphery of the two lateral portions 420 on the opposite sides to the grooves 433. Specifically, one groove 434 of the two grooves 434 is extended along the periphery of the lateral portion 420 on the Y-axis-direction minus side out of the periphery of the lateral portion 420 on the X-axis-direction plus side. The other groove 434 is extended along the periphery of the lateral portion 420 on the Y-axis-direction plus side out of the periphery of the lateral portion 420 on the X-axis-direction minus side.

As thus described, the grooves 431, 433, 434 form an annular groove along the periphery of the lateral portions 420. Specifically, the grooves 431, 433, 434 on the X-axis-direction plus side form a pentagonal annular groove on the X-axis-direction plus side, and the grooves 431, 433, 434 on the X-axis-direction minus side form a pentagonal annular groove on the X-axis-direction minus side. These two pentagonal annular grooves are configured not to be in contact with each other at the vertices (share the branch point 432), but the vertices are shifted from each other, and the pentagonal annular grooves come into contact at a part of the facing side (share a part of the groove 431).

The groove 430 is formed discontinuously on the opposite side to the intermediate portion 410. That is, the groove 433 and the groove 434 are not connected, and a discontinuous portion 435 is formed between the groove 433 and the groove 434.

The discontinuous portion 435 is a portion where the groove 430 is not formed at the end of the lateral portion 420 on the opposite side the intermediate portion 410, and the two discontinuous portions 435 are formed with respect to the two lateral portions 420. Specifically, one discontinuous portion 435 of the two discontinuous portions 435 is disposed on the X-axis-direction plus side and in the middle portion in the Y-axis direction of the lateral portion 420 on the X-axis-direction plus side. The other discontinuous portion 435 is disposed at the X-axis-direction minus side and in the middle portion in the Y-axis direction of the lateral portion 420 on the X-axis-direction minus side. That is, the two discontinuous portions 435 are aligned at both ends of the gas release valve 400 in the direction in which the positive terminal 200 and the negative terminal 300 are arranged (X-axis direction). The discontinuous portion is not disposed at the end of the gas release valve 400 in the Y-axis direction.

[2.3 Description of Configuration of First Part 421 and Second Part 422 of Lateral Portion 420]

The lateral portion 420 has a first part 421 on the inner side of the lateral portion 420 with respect to the groove 430 and a second part 422 on the outer side of the lateral portion 420 with respect to the groove 430. The first part 421 is a pentagonal portion on the inner side of the lateral portion 420 with respect to the grooves 431, 433, 434 formed along the periphery of the lateral portion 420. The second part 422 is a flat and annular portion on the outer side of the lateral portion 420 with respect to the grooves 431, 433, 434 formed along the periphery of the lateral portion 420.

The first part 421 has a shape protruding (bulging) toward the inside of the case 100 (toward the Z-axis-direction minus side). In other words, the first part 421 includes a portion with a concave-convex structure in which a concave part is formed on the outer surface and a convex part is formed on the inner surface. That is, the first part 421 includes a protruding portion that protrudes toward the inside of the case 100 from the second part 422 and the intermediate portion 410.

Thereby, in the lateral portion 420, the rigidity of the first part 421 is higher than that of the second part 422. The high rigidity means a state that is strong against an external force, and can be defined as, for example, a state in which a dimensional change (amount of deflection) is small with respect to a bending or twisting force, or a force necessary to cause the same dimensional change is large. The definition of the rigidity is not limited to the above but may be any definition within a range normally understandable by those skilled in the art. That is, in the lateral portion 420 in which the groove 430 is formed, the first part 421 on the inner side of the lateral portion 420 with respect to the groove 430 is formed to have higher rigidity than the second part 422 on the outer side of the lateral portion 420 with respect to the groove 430.

The shape and the protrusion height of the protruding portion of the first part 421 are not particularly limited, but from the viewpoint of ensuring the internal space of the case 100, it is preferable that the protruding portion of the first part 421 not protrude inside the case 100 from the inner surface of the lid body 110, or the protruding amount be as small as possible even when the protruding portion protrudes. Alternatively, the protruding portion of the first part 421 may be a portion having a shape protruding (bulging) toward the outside of the case 100 (on the Z-axis-direction plus side), that is, a concave-convex structure in which a concave part is formed on the inner surface and a convex part is formed on the outer surface This also increases the rigidity of the first part 421 than the second part 422. In this case, it is preferable that the protruding portion of the first part 421 not protrude outward from the outer surface of the lid body 110, or the protruding amount be as small as possible even when the protruding portion protrudes.

Figure 5:
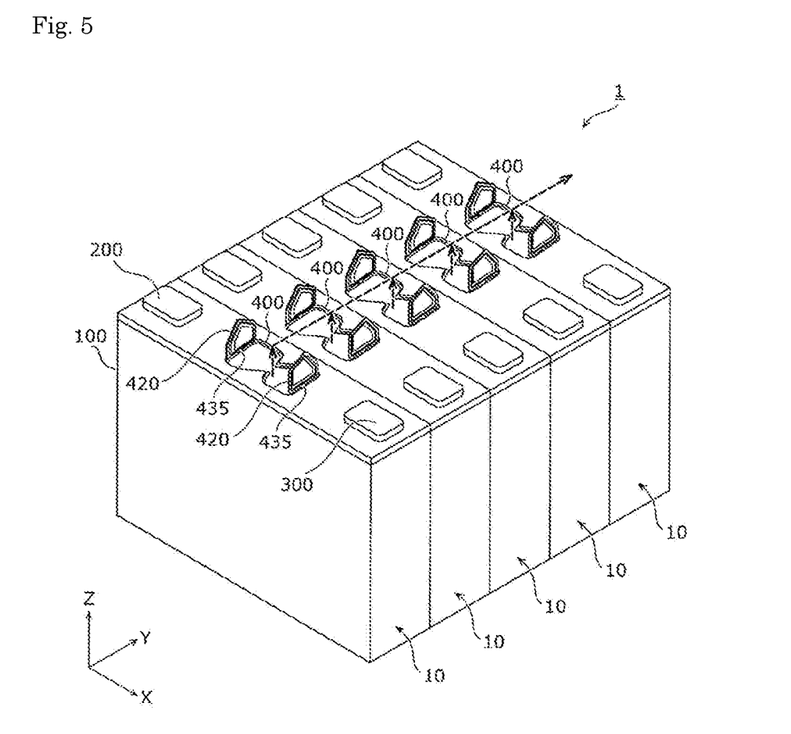
FIG. 5 is a perspective view showing a state where the gas release valve according to the embodiment is open.

Next, a state where the gas release valve 400 has been opened will be described. FIG. 5 is a perspective view showing a state where the gas release valve 400 according to the present embodiment has been opened. Specifically, FIG. 5 shows a state where the gas release valve 400 including a plurality of energy storage devices 10 has been opened in an energy storage apparatus 1 in which the plurality of energy storage devices 10 are aligned in the Y-axis direction such that the long side surfaces of the case 100 face each other.

The energy storage apparatus 1 is a battery module (assembled battery) provided with a plurality of energy storage devices each including at least one energy storage device 10 in which the gas release valve 400 is formed. In the present embodiment, the energy storage apparatus 1 includes five energy storage devices 10 described above. In FIG. 5, the energy storage apparatus 1 may include a spacer between adjacent energy storage devices 10, or may include other members (end plate, side plate, etc.), but the spacer and the like are omitted.

As shown in FIG. 5, when the gas release valve 400 is opened, the intermediate portion 410 is broken and the two lateral portions 420 aligned in the X-axis direction are lifted in the Z-axis direction. At this time, each lateral portion 420 is lifted in the Z-axis direction while the discontinuous portion 435 is fixed to the lid body 110. Since the discontinuous portion 435 is formed in the groove 430 on the side in the direction (X-axis direction) intersecting the direction (Y-axis direction) in which the plurality of energy storage devices 10 are aligned, the gas discharged from the gas release valve 400 flows in the Y-axis direction. That is, the gas discharged from the gas release valve 400 is prevented from flowing to the positive terminal 200 and the negative terminal 300 because the two lateral portions 420 lifted in the Z-axis direction become walls, and the gas flows in the Y-axis direction.

In FIG. 5, since the plurality of energy storage devices 10 are disposed in the Y-axis direction, the two lateral portions 420 of each energy storage device 10 become the walls, and a gas path (a path indicated by a broken line in the figure) is formed in the Y-axis direction. As a result, the gas discharged from the gas release valve 400 of each energy storage device 10 is prevented from flowing toward the positive terminal 200 and the negative terminal 300 of each energy storage device 10 and flows in the Y-axis direction. As described above, since the discontinuous portions 435 are disposed at both ends of the gas release valve 400 in the X-axis direction, when the gas release valve 400 is opened, a gas path directed in the Y-axis direction can be formed. That is, the gas release valve 400 of each energy storage device 10 is opened to form a passage for exhaust gas flowing in the direction in which the plurality of energy storage devices 10 are aligned.

Although all the gas release valves 400 included in the plurality of energy storage devices 10 have been opened in FIG. 5, even in a case where all the gas release valves 400 are not opened simultaneously, a gas path directed in the Y-axis direction is formed when at least one gas release valve 400 is opened. FIG. 5 shows the gas path so that the gas flows on the Y-axis-direction plus side, but the gas may flow on the Y-axis-direction minus side or on both sides of the Y-axis direction.

The gas release valve 400 is formed so as to have a large opening area. For this reason, when the gas release valve 400 is opened and the lateral portion 420 is lifted in the Z-axis direction, the tip of the lateral portion 420 in the Z-axis direction is disposed at a higher position than the terminal surfaces (the surfaces on the Z-axis-direction plus side) of the positive terminal 200 and the negative terminal 300.

3 Description of Effects

As described above, according to the energy storage device 10 in the embodiment of the present invention, the intermediate portion 410 of the thin wall 401 of the gas release valve 400 is disposed at the middle position of the lid body 110, and the intermediate portion 410 is formed to be smaller in width than the two lateral portions 420 sandwiching the intermediate portion 410. As thus described, in the gas release valve 400, the intermediate portion 410 disposed at the middle position of the lid body 110 is formed to be smaller in width than the lateral portions 420 on both sides, so that it is possible to enhance the rigidity of the intermediate portion 410 that is likely to deform due to fluctuations in the internal pressure of the case 100. Thereby, the intermediate portion 410 of the thin wall 401 in the gas release valve 400 can be prevented from deforming, so that the durability of the gas release valve 400 can be improved (fatigue strength can be improved).

In the energy storage device 10, it is preferable to improve the energy density. However, the more the energy density is improved, the larger the increase in the internal pressure of the case 100 becomes when a problem occurs. For this reason, the gas release valve 400 needs to be opened to discharge a large amount of gas from the gas release valve 400 at high speed so as not to cause a problem such as breakage of a joint portion between the lid body 110 and the case body 120 which occurs due to an increase in the internal pressure of the case 100. In order to discharge a large amount of gas from the gas release valve 400 at high speed, it is necessary to increase the opening area of the gas release valve 400. In contrast, the energy storage device 10 according to the present embodiment has improved the durability of the gas release valve 400 as described above, so that the opening area of the gas release valve 400 can be increased. For this reason, in the energy storage device 10, the energy density can be improved.

In the gas release valve 400, by forming the groove 430 in the thin wall 401, the pressure at which the gas release valve 400 is opened can be adjusted.

In the gas release valve 400, the groove 430 of the thin wall 401 has a plurality of branch points 432, each of which branches into a plurality of grooves (grooves 431, 432). By dividing the branch point 432 (intersection) of the groove 430 in the thin wall 401 into a plurality of sections as thus described, it is possible to avoid stress concentration at the branch point 432 and further prevent the deformation of the thin wall 401. By dividing the branch point 432 into a plurality of sections, the pressure at which the gas release valve 400 is opened can be made easily adjustable.

In the gas release valve 400, the plurality of branch points 432 of the groove 430 in the thin wall 401 are disposed in the intermediate portion 410. That is, although stress is likely to concentrate at the branch point 432, since the rigidity of the intermediate portion 410 has been enhanced, deformation is unlikely to occur even when the branch point 432 is disposed in the intermediate portion 410. By disposing the plurality of branch points 432 in the intermediate portion 410 where pressure is likely to be applied, the gas release valve 400 can be opened with the plurality of branch points 432 as starting points.

In the gas release valve 400, the plurality of branch points 432 of the groove 430 in the thin wall 401 are disposed within the linear groove 431. That is, the gas release valve 400 opens with the branch point 432 as the starting point, and since the groove 431 is configured to extend linearly from the branch point 432 to both sides, the gas release valve 400 can be smoothly opened with the branch point 432 as the starting point. For this reason, while the durability of the gas release valve 400 is improved, the gas release valve can be quickly opened once the valve starts to open.

In the lateral portions 420 of the gas release valve 400, the first part 421 on the inner side with respect to the groove 430 is formed to have higher rigidity than in the second part 422 on the outer side with respect to the groove 430. As thus described, by increasing the rigidity on the inner side of the groove 430 in the lateral portion 420 as thus described, it is possible to prevent the deformation on the inner side where pressure is likely to be applied and to further improve the durability of the gas release valve 400. That is, by forming the protruding portion (the protruding portion of the first part 421) on the inner side of the groove 430 in the lateral portion 420, the rigidity on the inside can be increased and the durability of the gas release valve 400 can be improved.

The groove 430 in the lateral portion 420 of the gas release valve 400 is formed discontinuously on the opposite side to the intermediate portion 410. As a result, even when the groove 430 (grooves 431, 433, 434) on the intermediate portion 410 side is torn in the lateral portion 420 during the opening of the gas release valve 400, a place (discontinuous portion 435) on the opposite side to the intermediate portion 410 where the groove 430 is discontinuously formed is hardly torn. This can prevent the lateral portion 420 from scattering. In particular, the gas release valve 400 with improved durability opens vigorously, and hence the effect of preventing the scattering of the lateral portions 420 is large.

With the two lateral portions 420 being arranged in the point-symmetrical position with respect to the center of the intermediate portion 410, the two lateral portions 420 can be opened with a good balance at the time of opening. The lateral portion 420 has a shape in which the width increases as the distance from the intermediate portion 410 increases, so that a wide opening area can be ensured when the lateral portion 420 opens from the intermediate portion 410.

According to the energy storage apparatus 1, in the energy storage device 10, the opening area of the gas release valve 400 can be increased by improving the durability of the gas release valve 400. In the energy storage apparatus 1 that includes the energy storage device 10 including the gas release valve 400 as above, when gas is generated inside the energy storage device 10, the gas release valve 400 is opened, and a large amount of gas can be discharged from the gas release valve 400 at high speed. Hence it is possible to prevent the heat generation of the energy storage device 10 in which gas has been generated, thereby preventing the influence of heat from transmitting sequentially to the adjacent energy storage device 10, for example.

Since the groove 430 formed in the gas release valve 400 of the energy storage device 10 is formed discontinuously on the side in the direction intersecting the direction in which the plurality of energy storage devices 10 are aligned, when the gas release valve 400 is opened, gas from the gas release valve 400 can be exhausted in the direction in which the plurality of energy storage devices 10 are aligned. Thus, in the energy storage apparatus 1 in which a plurality of energy storage devices 10 including the gas release valves 400 are aligned, exhaust gas from each energy storage device 10 can be smoothly and collectively exhausted in the direction in which the plurality of energy storage devices 10 are aligned.

4 Description of Modifications of Embodiment

Modification 1

Figure 6:
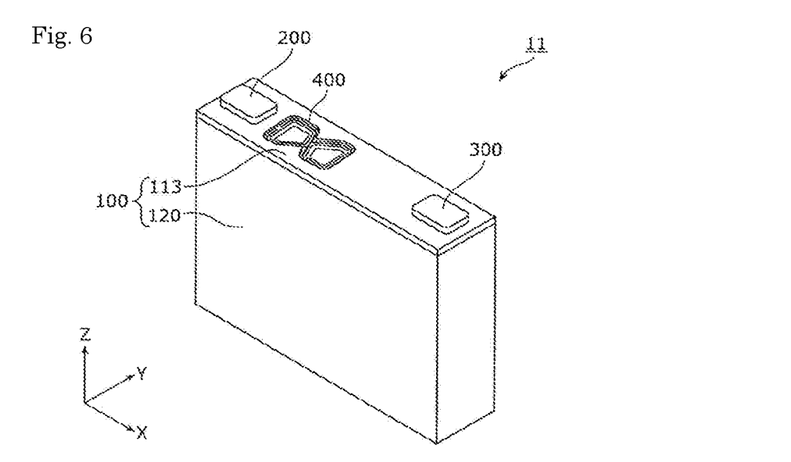
FIG. 6 is a perspective view showing an external appearance of an energy storage device including a lid body in which a gas release valve according to Modification 1 of the embodiment is formed.

Next, Modification 1 of the above embodiment will be described. FIG. 6 is a perspective view showing an external appearance of an energy storage device 11 including a lid body 113 in which a gas release valve 400 according to Modification 1 of the present embodiment is formed. FIG. 6 is a view corresponding to FIG. 1 in the above embodiment.

As shown in FIG. 6, the energy storage device 11 in the present modification includes a lid body 113 instead of the lid body 110 of the energy storage device 10 in the above embodiment. In the lid body 113, the gas release valve 400 is disposed not at the middle position in the X-axis direction but on the X-axis-direction minus side.

In the present modification, as in the above embodiment, the gas release valve 400 includes a thin wall 401 that is thinner than a portion adjacent to the gas release valve 400, and the thin wall 401 includes an intermediate portion 410 and two lateral portions 420 disposed at positions sandwiching the intermediate portion 410 in the first direction (X-axis direction). As described above, as viewed from the normal direction to the lid body 113 (Z-axis direction), the intermediate portion 410 is formed to be smaller in width in the second direction (Y-axis direction) orthogonal to the first direction than the two lateral portions 420. Further, a groove 430 is formed in the thin wall 401, and the groove 430 has a plurality of branch points 432 that branch into a plurality of grooves (grooves 431, 432).

As described above, according to the energy storage device 11 in the present modification, in the gas release valve 400, the intermediate portion 410 of the thin wall 401 is formed to be smaller in width than the lateral portions 420 on both sides. Thereby, the rigidity in the intermediate portion 410 can be enhanced, so that it is possible to prevent the deformation of the thin wall 401 of the gas release valve 400. By dividing the branch point 432 of the groove 430 in the thin wall 401 into a plurality of sections, it is possible to avoid stress concentration at the branch point 432 and further prevent the deformation of the thin wall 401. As a result, the durability of the gas release valve 400 can be improved (fatigue strength can be improved). By dividing the branch point 432 into a plurality of sections, the pressure at which the gas release valve 400 is opened can be made easily adjustable.

In FIG. 6, the gas release valve 400 is disposed on the X-axis-direction minus side of the lid body 113, but the gas release valve 400 may be disposed on the X-axis-direction plus side of the lid body 113. In a case where the electrode terminal is disposed at the middle position, the gas release valve 400 may be disposed at the end of the lid body 113.

Modification 2

Figure 7:
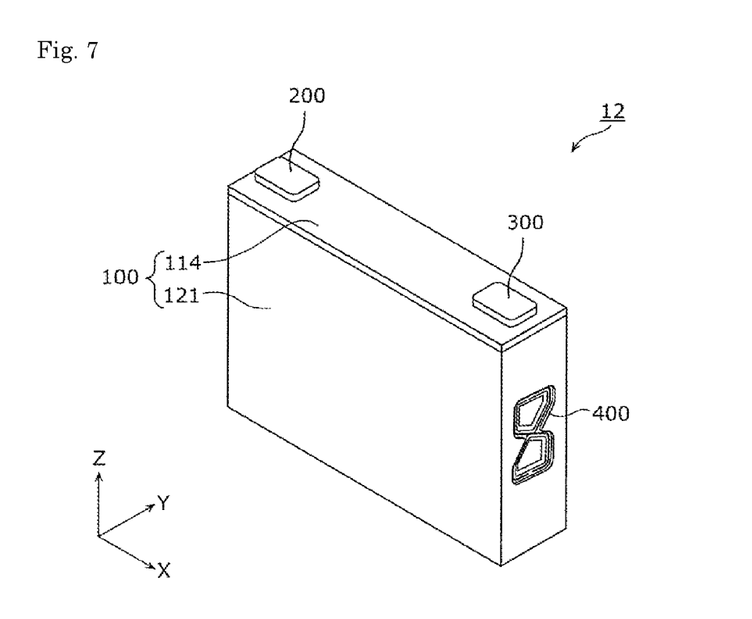
FIG. 7 is a perspective view showing an external appearance of an energy storage device including a case body in which a gas release valve according to Modification 2 of the embodiment is formed.

Next, Modification 2 of the above embodiment will be described. FIG. 7 is a perspective view showing an external appearance of an energy storage device 12 including a case body 121 in which the gas release valve 400 according to Modification 2 of the present embodiment is formed. FIG. 7 is a view corresponding to FIG. 1 in the above embodiment.

As shown in FIG. 7, the energy storage device 12 in the present modification includes a lid body 114 and a case body 121 instead of the lid body 110 and the case body 120 of the energy storage device 10 in the above embodiment. The lid body 114 is not provided with the gas release valve 400, and the case body 121 is provided with the gas release valve 400.

As described above, according to the energy storage device 12 in the present modification, it is possible to achieve the same effects as in the above embodiment. In FIG. 7, the gas release valve 400 is disposed at the middle position of the short side wall of the case body 121, but the gas release valve 400 may be disposed at the middle position of the long side wall of the case body 121 or may be disposed at a position other than the middle position as in Modification 1.

Modification 3

Figure 8:
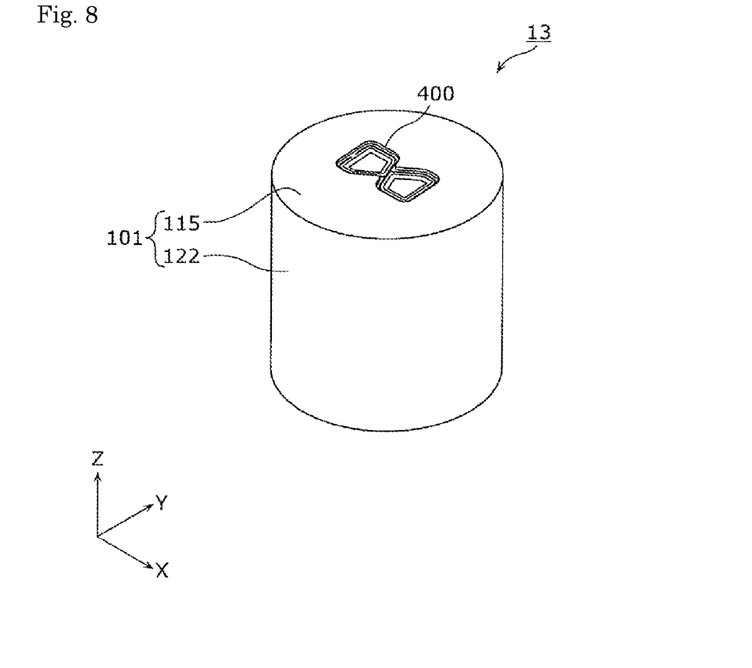
FIG. 8 is a perspective view showing an external appearance of an energy storage device including a case in which a gas release valve according to Modification 3 of the embodiment is formed.

Next, Modification 3 of the above embodiment will be described. FIG. 8 is a perspective view showing an external appearance of an energy storage device 13 including a case 101 in which a gas release valve 400 according to Modification 3 of the present embodiment is formed. FIG. 8 is a view corresponding to FIG. 1 in the above embodiment.

As shown in FIG. 8, the energy storage device 13 in the present modification includes a cylindrical case 101 instead of the case 100 of the energy storage device 10 in the above embodiment. The case 101 includes a disc-shaped lid body 115 and a cylindrical case body 122. A gas release valve 400 is disposed at the middle position of the lid body 115. In FIG. 8, the electrode terminals and the like are omitted.

As described above, according to the energy storage device 13 in the present modification, it is possible to achieve the same effects as in the above embodiment. In FIG. 8, the gas release valve 400 is disposed at the middle position of the lid body 115, but the gas release valve 400 may be disposed at a position other than the middle position as in Modification 1, or may be disposed in the case body 122.

In addition to the above, a long cylindrical shape or various other shapes can be considered as the shape of the energy storage device, or the gas release valve 400 may be disposed in a laminate type energy storage device.

Other Modifications

Although the energy storage devices according to the embodiment of the present invention and its modifications have been described above, the present invention is not limited to the above embodiment and its modifications. That is, the embodiment and its modification disclosed this time are illustrative in all points and are not restrictive. The scope of the present invention is defined by the claims and includes meanings equivalent to the claims and all modifications within the claims.

In the above embodiment and its modifications, in the gas release valve 400, the two lateral portions 420 have been arranged at positions sandwiching the intermediate portion 410 in the X-axis direction or the Z-axis direction. In the gas release valve 400, the two lateral portions 420 may be disposed at positions sandwiching the intermediate portion 410 in the Y-axis direction.

In the above embodiment and its modifications, the lateral portion 420 has had a pentagonal shape. The shape of the lateral portion 420 is not limited to the pentagonal shape, and may be a triangular shape, other polygonal shapes, a circular shape, an oval shape, an elliptic shape, or some other shape. The shape of the groove 430 (grooves 431, 433, 434) is preferably a shape along the periphery of the lateral portion 420, but is not limited thereto.

In the above embodiment and its modifications, the groove 430 has been formed in each of the two lateral portions 420. The groove 430 only needs to be formed in at least one of the two lateral portions 420, and may be configured to be formed only in one lateral portion 420. The groove 430 may not be formed in either the intermediate portion 410 or the lateral portion 420.

In the above embodiment and its modifications, the groove 430 has had two branch points 432. The groove 430 may have one or three or more branch points 432, and the placement position of the branch points 432 is not limited to the above. The groove 430 may be configured not to have the branch point 432.

In the above embodiment and its modifications, the branch point 432 has been disposed within the linear groove 431 in the intermediate portion 410. The branch point 432 may be disposed at the end of the groove 431, may be disposed in a groove other than the groove 431, or may be disposed in the lateral portion 420.

In the above embodiment and its modifications, the discontinuous portion 435 has been disposed at the end of the lateral portion 420 on the opposite side to the intermediate portion 410. The placement position of the discontinuous portion 435 is not particularly limited, and the number and length of the discontinuous portions 435 are not particularly limited. A configuration in which the discontinuous portion 435 is not disposed may be employed.

In the above embodiment and its modifications, the lateral portion 420 has been provided with the protruding portion in the first part 421, so that the first part 421 is formed to have higher rigidity than the second part 422. The method of enhancing the rigidity of the first part 421 is not limited to the above. The first part 421 may be formed to have higher rigidity than the second part 422 by, for example, forming the thickness of the first part 421 to be larger than the thickness of the second part 422. The first part 421 may not be formed with a protruding portion or the like, the first part 421 and the second part 422 may have the same rigidity, or the first part 421 may be formed to have lower rigidity than the second part 422.

The scope of the present invention also includes forms constructed by arbitrarily combining the components included in the above embodiment and its modifications.

The present invention can be realized not only as the energy storage device and the energy storage apparatus 1 but also as the gas release valve 400 provided in the energy storage device.

INDUSTRIAL APPLICABILITY

The present invention can be applied to an energy storage device such as a lithium ion secondary battery.

DESCRIPTION OF REFERENCE SIGNS

1: energy storage apparatus
10, 11, 12, 13: energy storage device
100, 101: case
110, 113, 114, 115: lid body
111, 112: adjacent portion
400: gas release valve
401: thin wall
410: intermediate portion
420: lateral portion
421: first part
422: second part
430, 431, 433, 434: groove
432: branch point
435: discontinuous portion

The invention claimed is:

1. An energy storage device comprising a case that includes a wall in which a gas release valve is formed, wherein
the gas release valve includes a thin wall with a thickness smaller than a thickness of a portion adjacent to the gas release valve,
the thin wall includes an intermediate portion and two lateral portions that are arranged at positions sandwiching the intermediate portion in a first direction, and
as viewed from a normal direction to the wall, the intermediate portion is disposed at a middle position in the first direction of the wall and is formed with a width, in a second direction orthogonal to the first direction, smaller than widths of the two lateral portions, and
wherein the intermediate portion includes a constricted portion where the width of the intermediate portion is smaller than the widths of the two lateral portions, and
wherein the thin wall comprises a groove with a branch point divided into a plurality of sections.

2. The energy storage device according to claim 1, wherein
the groove includes a plurality of branch points, each of which branches into a plurality of grooves.

3. The energy storage device according to claim 2, wherein the plurality of branch points is provided in the intermediate portion.

4. The energy storage device according to claim 2, wherein the plurality of branch points is disposed within a linear groove.

5. The energy storage device according to claim 1, wherein
the groove is formed in at least one of the two lateral portions, and
in the lateral portion in which the groove is formed, a first part on an inner side of the lateral portion with respect to the groove is formed to have higher rigidity than a second part on an outer side of the lateral portion with respect to the groove.

6. The energy storage device according to claim 1, wherein
the groove is formed in at least one of the two lateral portions, and
the groove is formed discontinuously on an opposite side to the intermediate portion.

7. An energy storage device comprising a case that includes a wall in which a gas release valve is formed, wherein
the gas release valve includes a thin wall with a thickness smaller than a thickness of a portion adjacent to the gas release valve,
the thin wall includes an intermediate portion and two lateral portions arranged at positions sandwiching the intermediate portion in a first direction,
the intermediate portion is formed with a width, in a second direction orthogonal to the first direction, smaller than widths of the two lateral portions as viewed from a normal direction to the wall,
a groove is formed in the thin wall, and
the groove has a plurality of branch points, each of which branches into a plurality of grooves, and
wherein the intermediate portion includes a constricted portion where the width of the intermediate portion is smaller than the widths of the two lateral portions.

8. An energy storage apparatus comprising a plurality of energy storage devices that include at least one of the energy storage devices according to claim 1.

9. The energy storage apparatus according to claim 8, wherein
the groove is formed in at least one of the two lateral portions provided in the at least one of the energy storage devices, and
the groove is formed discontinuously on a side in a direction intersecting the direction in which the plurality of energy storage devices are aligned.

10. The energy storage device according to claim 1, wherein the gas release valve comprises a pentagonal shape section.

11. The energy storage device according to claim 1, wherein the gas release valve includes at least part of an hour-glass type shape.

12. The energy storage device according to claim 1, wherein the gas release valve comprises two sections for release of gas including the two lateral portions that are arranged at symmetric points, and
wherein the two the lateral portions have one of a pentagonal shape, a triangular shape, other polygonal shape, a circular shape, an oval shape, and an elliptic shape.

13. The energy storage device according to claim 7, wherein the gas release valve comprises a pentagonal shape section.

14. The energy storage device according to claim 7, wherein the gas release valve includes at least part of an hour-glass type shape.

15. The energy storage device according to claim 7, wherein the gas release valve comprises two sections for release of gas including the two lateral portions that are arranged at symmetric points,
wherein the two the lateral portions have one of a pentagonal shape, a triangular shape, other polygonal shape, a circular shape, an oval shape, and an elliptic shape.

16. The energy storage device according to claim 7, wherein the thin wall comprises a groove with a branch point divided into a plurality of sections.

* * * * *